(12) United States Patent
Larsson

(10) Patent No.: US 11,531,764 B2
(45) Date of Patent: Dec. 20, 2022

(54) ASSESSING OPERATIONAL STABILITY OF COMPUTER SYSTEM BY INTEGRITY CHECKING OF COMPUTER PROGRAM

(71) Applicant: Fossid AB, Stockholm (SE)

(72) Inventor: Johan Larsson, Malmö (SE)

(73) Assignee: Fossid AB, Stockholm (SE)

( * ) Notice: Subject to any disclaimer, the term of this patent is extended or adjusted under 35 U.S.C. 154(b) by 264 days.

(21) Appl. No.: 16/838,937

(22) Filed: Apr. 2, 2020

(65) Prior Publication Data
US 2021/0256136 A1   Aug. 19, 2021

(30) Foreign Application Priority Data

Feb. 14, 2020   (EP) .................................... 20157491

(51) Int. Cl.
*G06F 21/57*    (2013.01)
*G06F 8/41*     (2018.01)
*G06F 21/00*    (2013.01)

(52) U.S. Cl.
CPC ............ *G06F 21/577* (2013.01); *G06F 8/425* (2013.01)

(58) Field of Classification Search
CPC ........ G06F 21/577; G06F 21/50; G06F 21/55; G06F 21/56; G06F 21/561; G06F 21/562; G06F 21/563; G06F 21/564; G06F 8/425
See application file for complete search history.

(56) References Cited

U.S. PATENT DOCUMENTS

2013/0326625 A1 * 12/2013 Anderson ............... G06F 21/56
                                                   726/23
2014/0223565 A1    8/2014 Cohen

OTHER PUBLICATIONS

European Search Report Re: Application No. 20157491.0 dated Sep. 22, 2020 (Reference No. E159980002).

* cited by examiner

*Primary Examiner* — Edward Zee
(74) *Attorney, Agent, or Firm* — Chernoff, Vilhauer, McClung & Stenzel, LLP

(57) ABSTRACT

A computer-implemented method for checking the integrity of a target computer program to be executed in a computer system.

22 Claims, 9 Drawing Sheets

ASSESSING OPERATIONAL STABILITY OF COMPUTER SYSTEM BY INTEGRITY CHECKING OF COMPUTER PROGRAM

CROSS REFERENCE TO RELATED APPLICATIONS

This application claims priority under 35 U.S.C. § 119(b) to European Patent Application No. 20157492.8, filed on Feb. 14, 2020, the contents of which are hereby incorporated by reference.

TECHNICAL FIELD

The present invention generally relates to technical provisions for assessing operational stability of computer systems. More particularly, the present invention generally relates to a computer-implemented method for checking the integrity of a target computer program to be executed in a computer system, the target computer program having a target source code. The invention also relates to an associated apparatus for checking the integrity of a target computer program to be executed in such a computer system, to an associated computer program product and to an associated computer readable medium.

BACKGROUND

Computer systems are used virtually everywhere in modern society. As is well known, a general computer system comprises at least one processing device which is configured to execute at least one computer program being defined by at least one source code. The source code defines computer program code instructions, that may be run by the processing device to perform certain intended functionality.

Our daily lives strongly depend on computer systems being operationally stable in the sense that they must both function flawlessly (i.e., perform the intended functionality without malfunctions) and remain operational for long periods of time without interruptions. Since the source code in effect controls the behavior of the computer system, it is of paramount importance that it contains the correct computer program code instructions. New source code can however be written in different ways by different software developers, and existing source code can be subjected to code modifications, partial code deletions, code rearrangements, code mergers, etc. Over time, therefore, the source code may have undergone substantial changes.

To an operator, host or user of a computer system, the integrity of the computer program as defined by the source code may be fundamentally important for ensuring operational stability of the computer system. It may, however, be a far from easy task for the operator, host or user to know whether and to what extent the integrity of the computer program is satisfactory.

In light of the observations above, the present inventor has realized that there is room for improvements when it comes to technical provisions for assessing operational stability of computer systems.

SUMMARY

It is accordingly an object of the invention to eliminate or alleviate at least some of the problems or drawbacks referred to above.

One aspect of the present invention therefore is a computer-implemented method for checking the integrity of a target computer program to be executed in a computer system. The target computer program has a target source code, and the method involves:

A) obtaining a plurality of reference source code segments which are considered critical to the integrity of the target computer program;

B) for each reference source code segment in said plurality of reference source code segments:
  i) processing the reference source code segment to derive tokens therein and their respective offsets in the segment;
  ii) for each n-gram of tokens in the reference source code segment, creating a hash and a list of the offsets of the tokens in the n-gram;
  iii) generating a reference hash set for the reference source code segment, the reference hash set comprising the hashes as keys and the respective lists of offsets as values;

C) processing the target source code to derive tokens therein and their respective offsets in the target source code;

D) for each n-gram of tokens in the target source code, creating a hash and a list of the offsets of the tokens in the n-gram;

E) generating a target hash set for the target source code, the target hash set comprising the hashes from step D) as keys and the respective lists of offsets from step D) as values;

F) for each reference source code segment in said plurality of reference source code segments:
  i) comparing the hashes in the reference hash set to the hashes in the target hash set to do at least one of the following:
    a) calculate a score reflecting a degree of match between the reference hash set and the target hash set; and
    b) create a hit list comprising offsets of hashes in the reference hash set that match any of the hashes in the target hash set; and G) making a decision about the integrity of the target computer program by assessing, based on the calculated score and/or the created hit list of at least one of said plurality of reference source code segments, whether or not, or to what extent, said at least one of said plurality of reference source code segments is included in the target source code.

As used herein, "target computer program" refers to an arbitrary computer program, the integrity of which is to be checked by means of the present invention, and "target source code" accordingly refers to the source code of that computer program.

"Token" refers to a sequence of characters in the source code that has recognizable first and last characters with intermediate characters in between, the sequence of characters typically being separated from the rest of the source code by certain special characters like space, comma, semicolon, period, etc., and the sequence of characters typically having a semantical meaning. A word in a text is the most typical example of a token.

The term "n-gram" refers to a contiguous sequence of tokens. The value of n may be 3, or 2 or 4, or another integer value, preferably >1.

A second aspect of the invention is an apparatus for checking the integrity of a target computer program to be executed in a computer system, the target computer program having a target source code, the apparatus comprising a processing device configured for:

A) obtaining a plurality of reference source code segments which are considered critical to the integrity of the target computer program;

B) for each reference source code segment in said plurality of reference source code segments:

i) processing the reference source code segment to derive tokens therein and their respective offsets in the segment;

ii) for each n-gram of tokens in the reference source code segment, creating a hash and a list of the offsets of the tokens in the n-gram;

iii) generating a reference hash set for the reference source code segment, the reference hash set comprising the hashes as keys and the respective lists of offsets as values;

C) processing the target source code to derive tokens therein and their respective offsets in the target source code;

D) for each n-gram of tokens in the target source code, creating a hash and a list of the offsets of the tokens in the n-gram;

E) generating a target hash set for the target source code, the target hash set comprising the hashes from step D) as keys and the respective lists of offsets from step D) as values;

F) for each reference source code segment in said plurality of reference source code segments:

I) comparing the hashes in the reference hash set to the hashes in the target hash set to do at least one of the following:

a) calculate a score reflecting a degree of match between the reference hash set and the target hash set; and b) create a hit list comprising offsets of hashes in the reference hash set that match any of the hashes in the target hash set; and G) making a decision about the integrity of the target computer program by assessing, based on the calculated score and/or the created hit list of at least one of said plurality of reference source code segments, whether or not, or to what extent, said at least one of said plurality of reference source code segments is included in the target source code.

A third aspect of the invention is a computer program product comprising computer program code for performing the method according to the first aspect, when the computer program code is executed by a processing device.

A fourth aspect of the invention is a computer readable medium having stored thereon a computer program comprising computer program code for performing the method according to the first aspect when the computer program code is executed by a processing device.

The invention is based on the inventive understanding that the operational stability of a computer system can be assessed by checking the integrity of a target computer program to be executed in the computer system. Embodiments of the invention have the ability to evaluate, quickly and with high confidence, whether or not information which can be considered critical to the integrity of the target computer program is included in a target source code. Embodiments of the invention can do this even when changes have been made to the critical information, for instance change in individual words in the target source code, introduction of special characters in the target source code, or moving of text chunks in the target source code.

Such critical information is handled in the form of a plurality of reference source code segments in the present invention. The reference source code segments may advantageously define critical functions representing key parts of the functionality to be performed by the computer system when the computer program is executed. Alternatively or additionally, the reference source code segments may contain technical background information for future use in modification or development of the target source code, or license statements or copyright notices about the right to use the target source code or respective parts thereof.

Differently put, an understanding that forms the foundation of the present invention is that the presence of critical information in a target source code is important for the integrity or operational stability of a computer system in which the target source code shall execute, and the present invention provides an efficient and accurate way of analyzing whether and to what extent such critical information is in fact contained in the target source code.

In embodiments of the invention, a control signal for the computer system may be generated to prevent execution of the target computer program if the decision in the aforementioned step G) does not indicate integrity of the target computer program. Alternatively or additionally, embodiments of the invention may further involve generating report data based on the aforementioned decision made in step G). Such report data may reflect the decision and, additionally, at least one of the calculated score and an indication of said at least one of said plurality of reference source code segments. The generated report data may be sent or presented to an operator of the computer system, and/or a developer of the target source code.

The provision of a method, apparatus, computer program product and computer readable medium as disclosed herein will solve or at least mitigate one or more of the problems or drawbacks identified in the Background section of this document. These and other aspects, objectives, features and advantages of the invention and its disclosed embodiments will appear from the following detailed disclosure, from the attached dependent claims as well as from the drawings.

Generally, all terms used in the claims are to be interpreted according to their ordinary meaning in the technical field, unless explicitly defined otherwise herein.

All references to "a/an/the [element, device, component, means, step, etc.]" are to be interpreted openly as referring to at least one instance of the element, device, component, means, step, etc., unless explicitly stated otherwise. The steps of any method disclosed herein do not have to be performed in the exact order disclosed, unless explicitly stated.

A reference to an entity being "designed for" doing something, or "capable of" doing something in this document is intended to mean the same as the entity being "arranged for", "configured for" or "adapted for" doing this very something, and vice versa.

DETAILED DESCRIPTION

Figure 1:
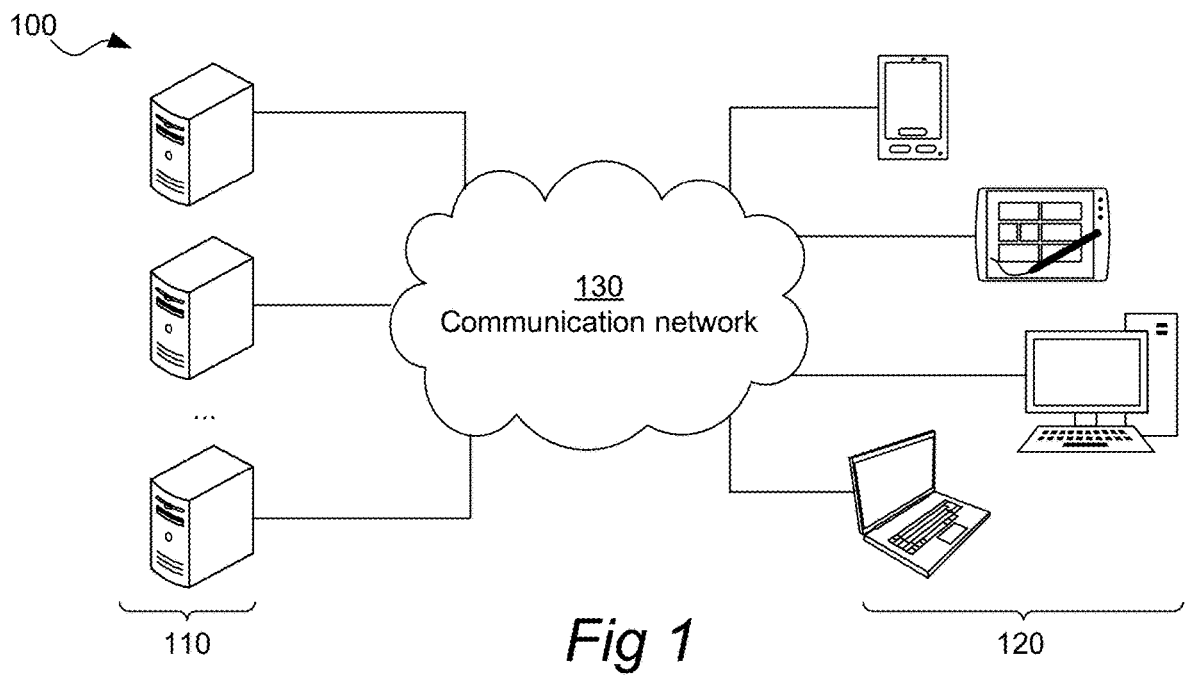
FIG. 1 illustrates a general computer network comprising various kinds of computing devices.

Embodiments of the invention will now be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

FIG. 1 illustrates a general computer network 100 that comprises various kinds of computing devices 110, 120. The computing devices include typical end-user devices 120, or client devices, such as tablet computers (e.g. surf pads), mobile terminals (e.g. smartphones or personal digital assistants), or personal computers (e.g. laptops, personal computers or work stations). The computing devices also include typical server devices 110, which may be physically separable devices, or distributed (e.g. cloud-based) computing resources, or a combination thereof.

The computing devices 110, 120 communicate by wireless and/or wired networked communication, illustrated in a simplified manner in the form of one common communication network 130. The wireless networked communication may include one or more of WIFI, Bluetooth®, W-CDMA, GSM, UTRAN, HSPA, LTE and LTE Advanced, to name a few. The wired networked communication may include one or more of USB, Ethernet or TCP/IP, to name a few. The communication network 130 may be the Internet or a part thereof.

Figure 2:
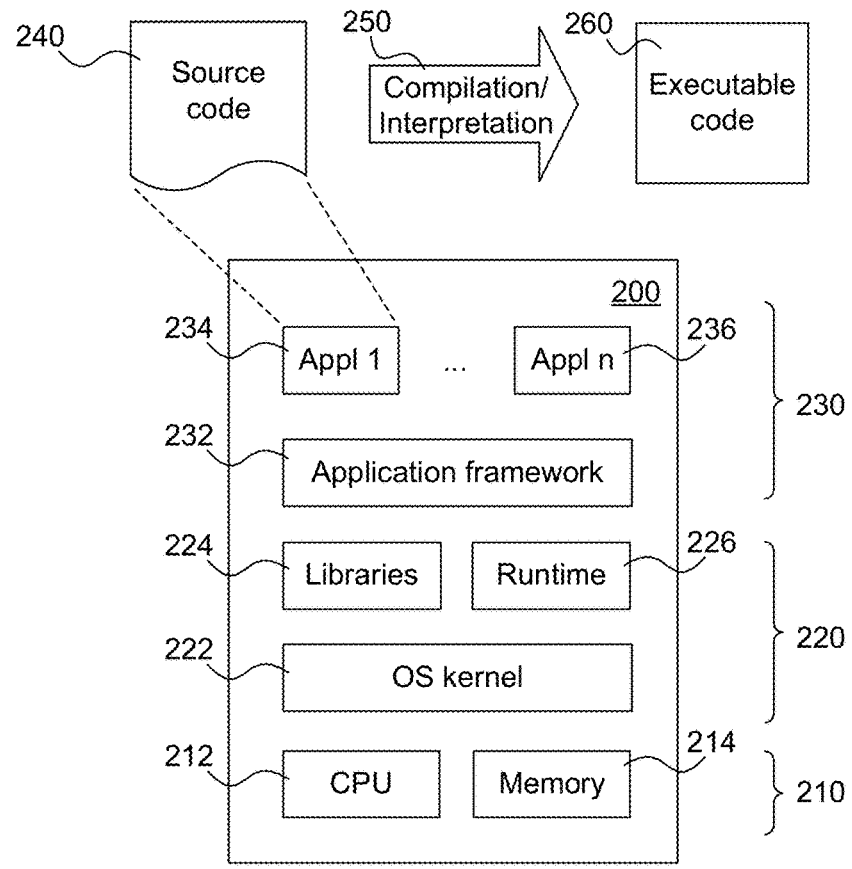
FIG. 2 is a schematic block diagram of some typical components of a general computer system, for instance any of the computing devices shown in FIG. 1.

FIG. 2 is a schematic block diagram of some typical components of a general computer system 200. The computer system 200 may, for instance, be any of the types of computing devices 110, 120 shown in FIG. 1. As seen in FIG. 2, the computer system 200 comprises a processing device 212 (or a cooperative plurality of such processing devices) and a memory 214 (or a cooperative plurality of such memories).

The processing device 212 is responsible for the overall operation of the computer system 200 and is preferably implemented by any commercially available CPU ("Central Processing Unit"), DSP ("Digital Signal Processor") or any other electronic programmable logic device. The processing device 212 is configured to read instructions from the memory 214 and execute these instructions to control the operation of the computer system 200. The memory 214 may be implemented using any commonly known technology for computer-readable memories such as ROM, RAM, SRAM, DRAM, CMOS, FLASH, DDR, EEPROM memory, flash memory, hard drive, optical storage or any combination thereof.

The processing device 212 and the memory 214 can be seen as a hardware layer 210 of the computer system 200. The computer system 200 further has a software architecture which includes an operating system layer 220 and an application program layer 230. The operating system layer 220 includes an operating system (OS) kernel 222, various code libraries 224, and a runtime 225. The application program layer 230 comprises an application framework 232 that supports various application programs 234-236. For exemplifying purposes in the present description, it is assumed that the application program 234 is the target computer program, the integrity of which is checked by means of the present invention. The operating system may, for instance, be Apple OSX, Microsoft Windows, Unix, Android or Apple iOS.

The application program 234 is defined by source code 240. As seen at 250, compilation or interpretation will generate executable code 260 from the source code. The executable code will contain sets of instructions that when executed by the processing device 212 will control the operation of the computer system 200 by performing the functionality intended by the application program 234.

Needless to say, the computer system 200 may typically comprise user interface devices (particularly when the computer system 200 is an end-user (client) device, like 120 in FIG. 1), and communication interface devices being adapted to allow the computer system 200 to communicate with other devices through the use of wired or wireless communication, for instance as described above for FIG. 1. Moreover, the components of the computer system 200 may be distributed over more than one physical device, such as in a client-server or cloud computing architecture. Accordingly, the computer system is not limited to being merely a single physical device.

Figure 3A:
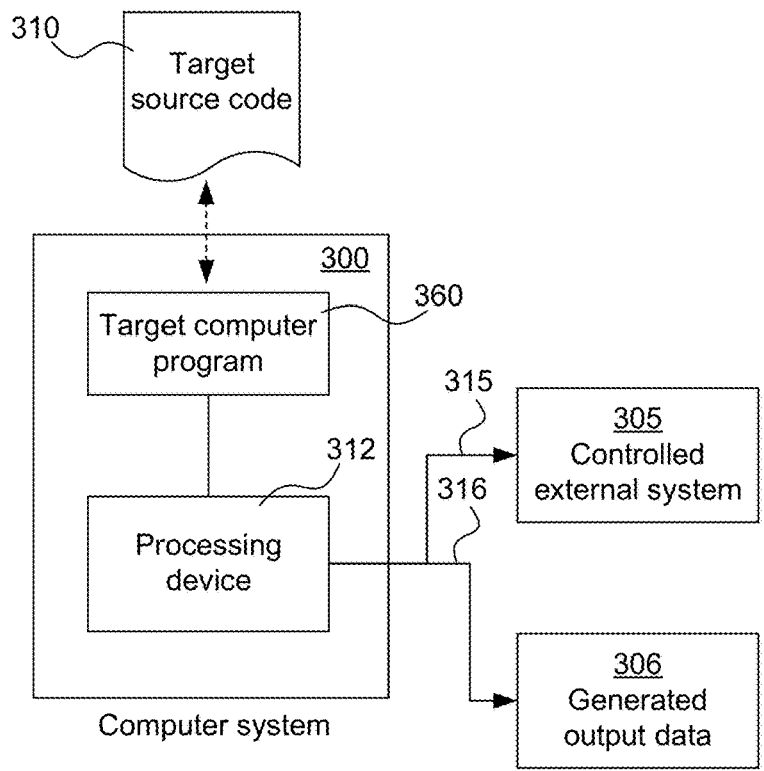
FIG. 3A is a schematic illustration of a computer system adapted to execute a target computer program, the target computer program having a target source code.

FIG. 3A is a schematic illustration of a computer system 300 that comprises a processing device 312 (cf. 212 in FIG. 2) being adapted to execute a target computer program 360 having a target source code 310 (cf. 234 and 240 in FIG. 2). One possible task of the computer system 300 when executing the target computer program 360 may be to control an external system 305 by generating control signals 315. The external system 305 may, for instance, be an industrial process or plant, or technical equipment in a private home or a public building, etc. As already discussed in the background section of this document, the computer system needs to be operationally stable both by functioning flawlessly and by remaining operational for long periods of time without interruptions. This requires the target computer program 360 to perform the intended functionality without malfunctions, bugs or malicious activity, i.e. to have integrity. Since it is the target source code 310 that defines the target computer program 360 and therefore in effect controls the behavior of the computer system 300, the target source code 310 must contain the correct computer program code instructions and nothing else. As was explained in the Background section, however, the target source code 310 may be written in different ways by different software developers, and it may undergo code modifications, partial code deletions, code rearrangements, code mergers, etc., over time.

Another possible task of the computer system 300 when executing the target computer program 360 may be to generate output data 306 through control signals 316. The output data 306 may represent key information for use by other technical systems or human readers. For similar reasons as were given above, it is typically quite important that the generated output data 306 is correct and free from errors. Again, the target computer program 360 should perform the intended functionality without malfunctions, bugs or malicious activity, i.e. have integrity.

Figure 3B:
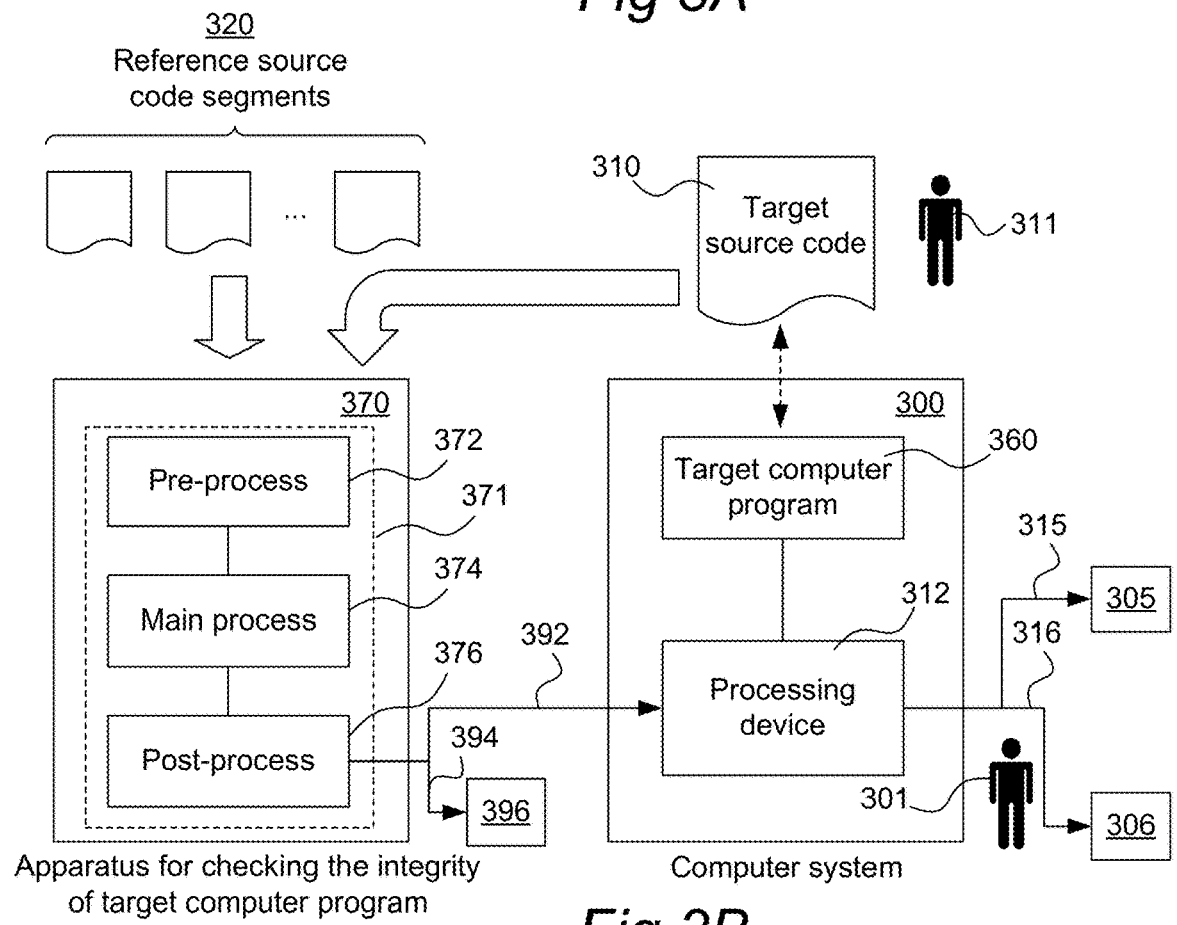
FIG. 3B is a schematic illustration of an apparatus for checking the integrity of a target computer program to be executed in a computer system, for instance the computer system in FIG. 3A.

FIG. 3B is a schematic illustration of an apparatus 370 for checking the integrity of the target computer program 360 to be executed by the computer system 300. The apparatus 370 comprises a processing device 371 which is configured for performing functionality of a computer-implemented method 400. The method 400 is illustrated in more detail as flowchart diagrams in FIG. 4A and FIG. 4B.

Figure 3C:
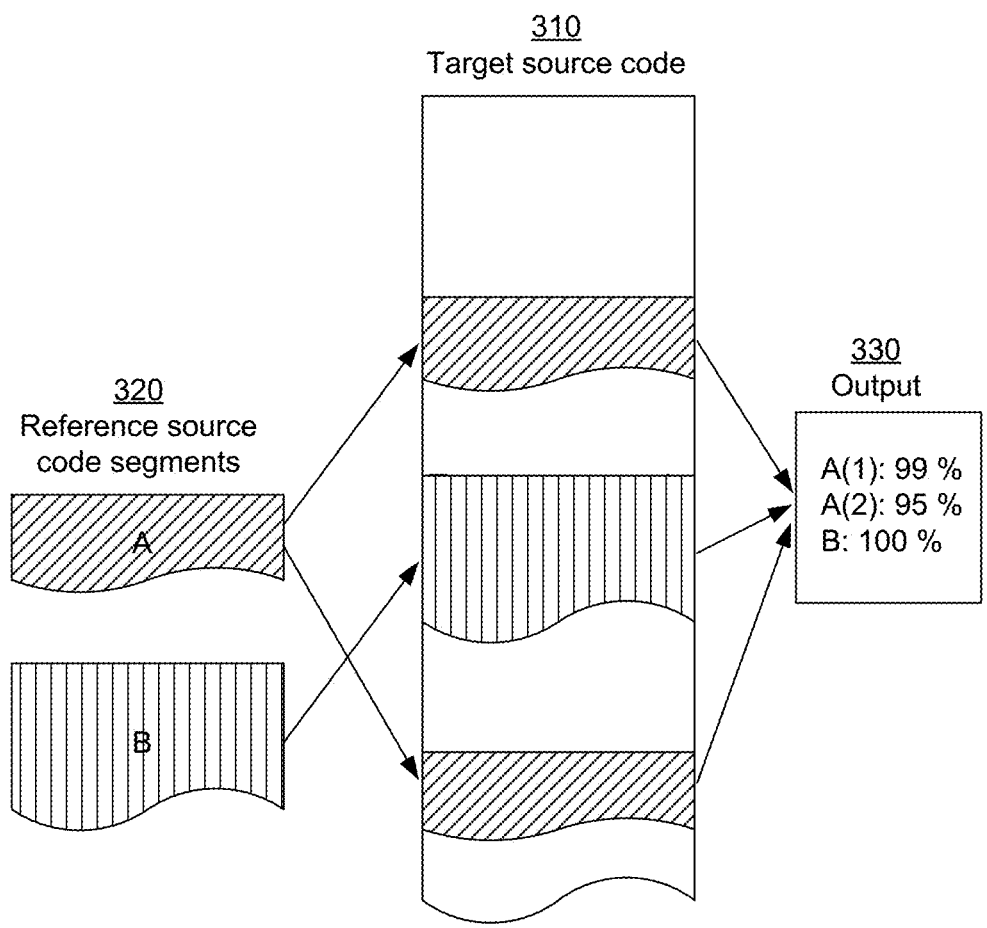
FIG. 3C is a schematic illustration of reference source code segments which are considered critical to the integrity of a target computer program and which may be used in a computer-implemented method like the one illustrated in FIG. 4A and FIG. 4B.

The purpose of the apparatus 370 and computer-implemented method 400 can be explained with reference to FIG. 3C. The integrity of the target computer program 360 may be checked by analyzing the target source code 310 to determine whether or not, or to what extent, certain reference source code segments 320 that are considered critical to the integrity of the target computer program 360 are represented in the target source code 310. As can be seen to the right in FIG. 3C, the output 330 of the analysis by the apparatus 370 and computer-implemented method 400 will contain an indication of whether or not (yes/no) or alternatively to what extent (as percentages) the respective reference source code segments 320 are in fact represented in the target source code 310. Embodiments of the apparatus 370 and computer-implemented method 400 can correctly handle also situations where a certain reference source code segment 320 has been subjected to minor modifications (extra characters, change in individual code words, etc.), or has been moved or duplicated.

Reference is now made again to FIG. 3B and the apparatus 370 for checking the integrity of the target computer program 360 to be executed by the computer system 300. The processing device 371 of the apparatus 370 comprises a first module 372 for pre-processing functionality, a second module 374 for main processing functionality (essentially corresponding to the steps of the method in FIG. 4A and FIG. 4B), and a third module 376 for post-processing functionality (post-processing functionality of some embodiments is seen at steps 480-486 at the end of the flowchart in FIG. 4B). In some embodiments, the processing device 371 is implemented by customized hardware (such as, for instance, an ASIC or FPGA). In other embodiments it may be implemented by a general-purpose processor (such as, for instance, a CPU or DSP) being programmed by software customized to perform the functionality of the method 400 as described herein.

The processing device 371 takes the target source code 310 as input. Further input to the processing device 371 is a plurality of reference source code segments 320. As previously mentioned, the reference source code segments 320 are considered critical to the integrity of the target computer program 360. For instance, the reference source code segments 320 may be considered critical to the integrity of the target computer program 360 because they represent important program functionality. The plurality of reference source code segments will thus contain source code that define critical functions representing key parts of the functionality to be performed by the computer system 300 when the target computer program 360 is executed.

Alternatively or additionally, the reference source code segments 320 may be considered critical to the integrity of the target computer program 360 because they represent important technical background information for future modification or development of the target source code 360.

As a further alternative, the plurality of reference source code segments 320 may be considered critical to the integrity of the target computer program 360 because they contain certain license statements or copyright notices about the right to use the target source code 360 or respective parts thereof. The rationale here is that when certain license statements or copyright notices appear in a source code, this can be seen as a clear indication that the program developer has applied proper programming practices and moreover made use of widely recognized pieces of third-party software to implement key functionality in the source code. Appearance of such certain license statements or copyright notices in the source code can therefore be a positive indication of the computer program's integrity.

The processing device 371 can obtain the plurality of reference source code segments 320 in different ways. For instance, artificial intelligence (or alternatively a programmer, developer, technician or other human user), may make an appropriate selection of reference source code segments 320 from a library of source code segments, the selection being based on investigations, knowledge, experience or advice from external experts and made in due consideration of the type, nature, tasks and intended operation of the target computer program 360, and accordingly input the plurality of reference source code segments 320 to the apparatus 370. Alternatively, the plurality of reference source code segments may be predefined.

Once the plurality of reference source code segments 320 has been obtained in any of the ways discussed above (also see step 410 in FIG. 4A), the pre-processing functionality 372 may perform certain filtering by, for instance, removing parts of a reference source code segment that are not relevant. Irrelevant parts may for instance be special characters, programmer's comments in the code, etc.

After the pre-processing functionality 372, the main processing functionality 374 commences. This will now be described in detail for the steps in FIG. 4A and FIG. 4B, with reference also being made to the other drawings.

Figure 4A:
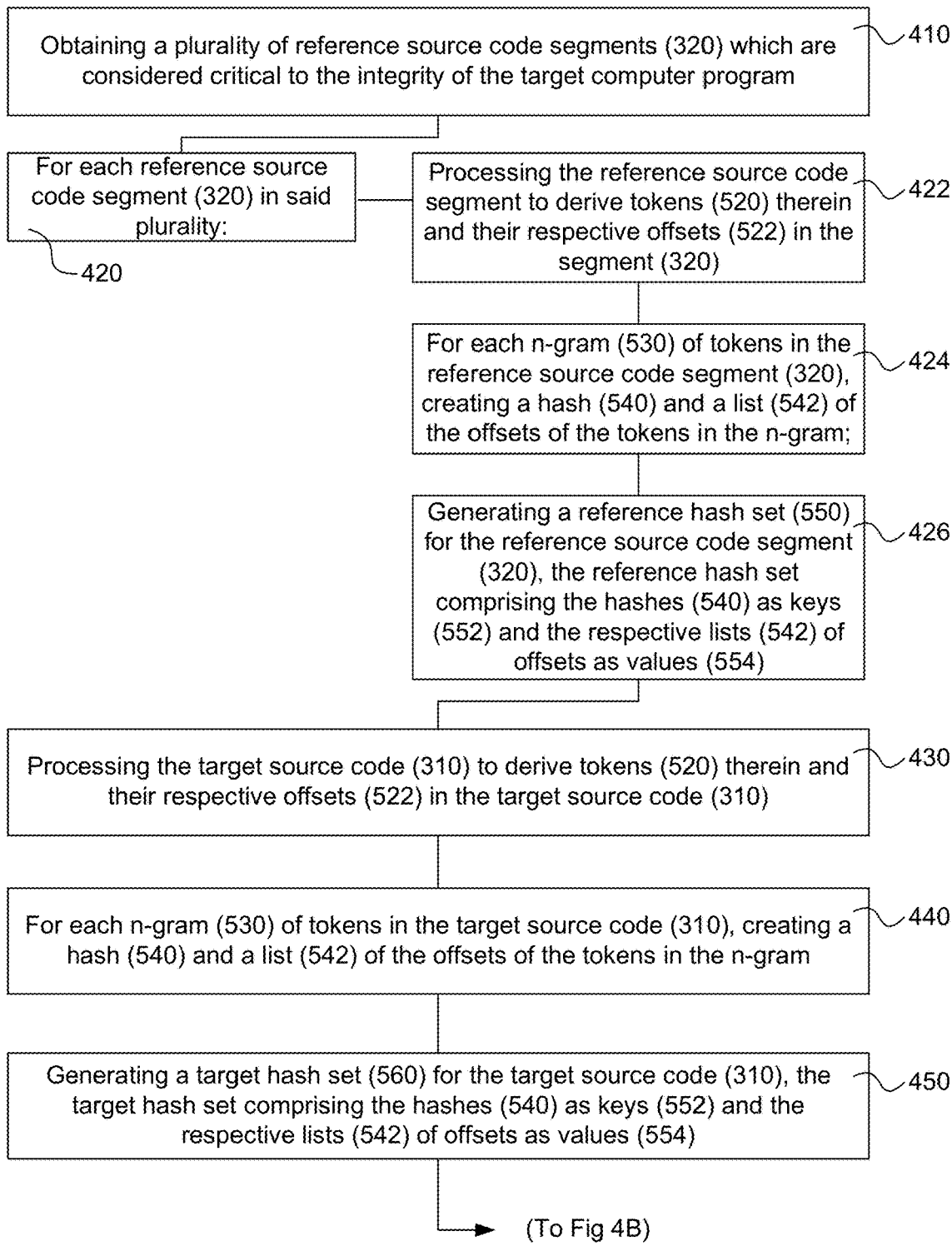
FIG. 4A is a first part of a flowchart diagram that illustrates a computer-implemented method for checking the integrity of a target computer program to be executed in a computer system.
Figure 5A:
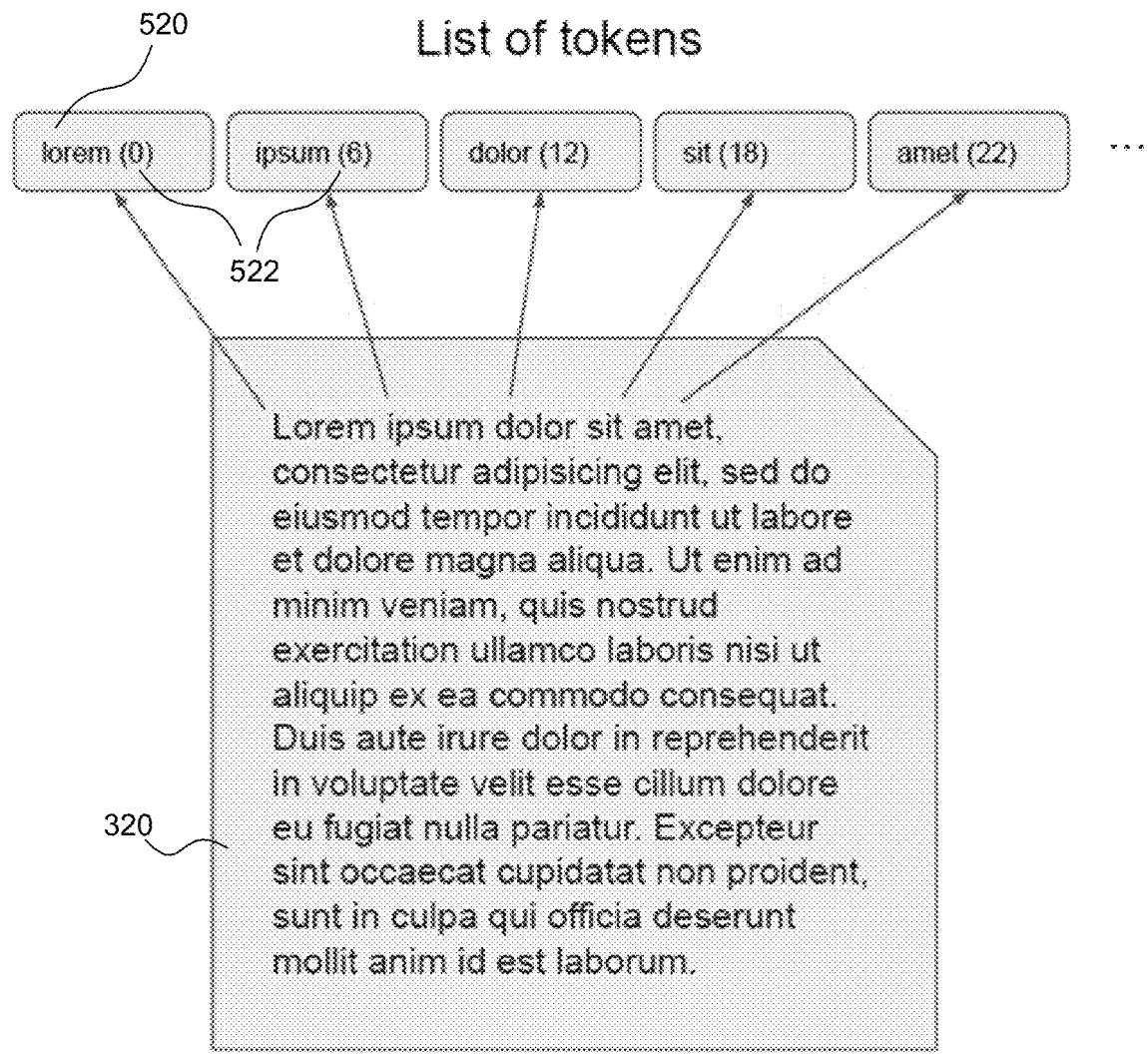
FIGS. 5A, 5B and 5C are schematic illustrations that will facilitate the understanding of a computer-implemented method like the one illustrated in FIG. 4A and FIG. 4B.

As seen at 420 in FIG. 4A, the following takes place for each reference source code segment 320 in the plurality of reference source code segments:

The reference source code segment 320 is processed to derive tokens 520 therein as well as their respective offsets 522 in the reference source code segment 320. See FIG. 5A as well as step 422 in FIG. 4A. As discussed already in the Summary section of this document, a token is typically an individual word in the reference source code segment. The offset 522 of the token 520 is the position of the first character of the token in the text of the reference source code segment. See for instance FIG. 5A, where the first token "Lorum" has an offset=0 (since the "L" in "Lorum" is at the very first character position in the text of the reference source code segment 320), whereas the second token "ipsum" has an offset=6 (since the "i" in "ipsum" is positioned six characters after the "L" in "Lorum"). The derived offset of a token is stored together with metadata as appropriate, such as token index and token character length. Token index is the position of the token 520 among the tokens that make up the reference source code segment 320.

Figure 5B:
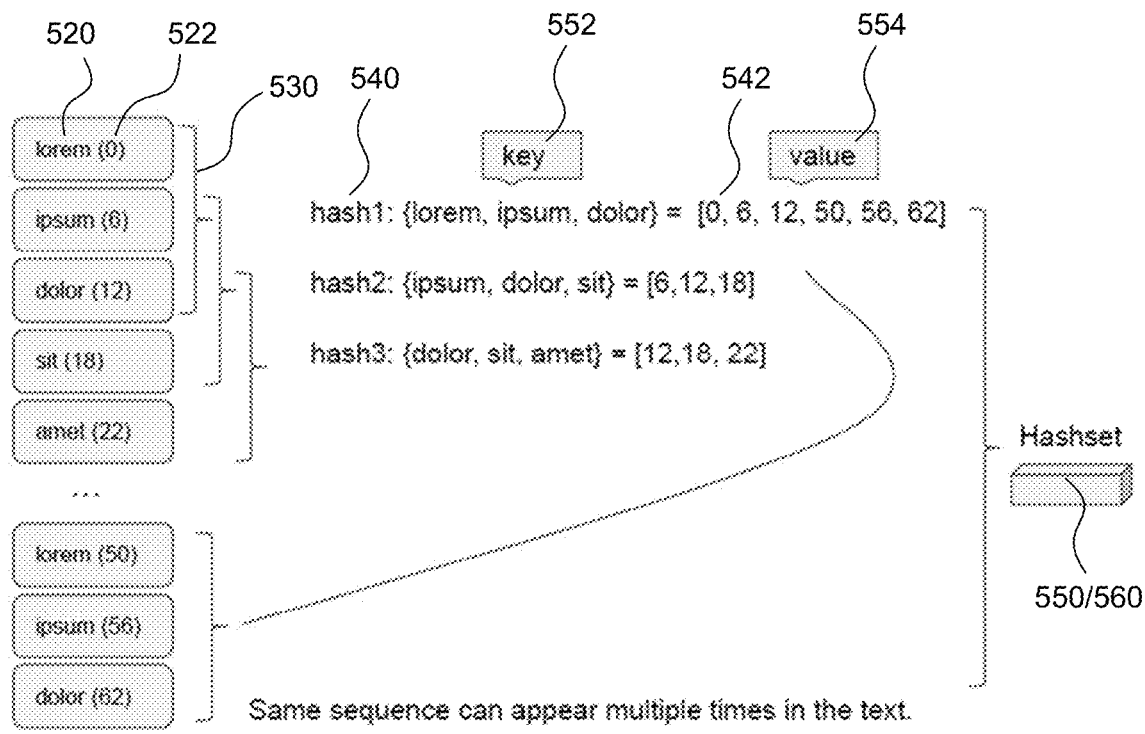

Then, for each n-gram 530 of tokens in the reference source code segment 320, a hash 540 and a list 542 of the offsets of the tokens in the n-gram are created. See FIG. 5B as well as step 424 in FIG. 4A. In the disclosed embodiment, n=3. Hence, each n-gram 530 will consist of three contiguous tokens (words) in the reference source code segment 320. In other embodiments, n may have another integer value, preferably no less than 2.

A reference hash set 550 is generated for the reference source code segment 320. The reference hash set 550 comprises the hashes 540 as keys 552 and the respective lists 542 of offsets as values 554. See FIG. 5B as well as step 426 in FIG. 4A.

Operations corresponding to those made in steps 422-426 in FIG. 4A for each reference source code segment 320 are then made also on the target source code 310:

The target source code 310 is processed to derive tokens 520 therein as well as their respective offsets 522 in the reference source code segment 320. See FIG. 5A as well as step 430 in FIG. 4A.

Then, for each n-gram 530 of tokens in the target source code 310, a hash 540 and a list 542 of the offsets of the tokens in the n-gram are created. See FIG. 5B as well as step 440 in FIG. 4A.

A target hash set 560 is generated for the target source code 310. The target hash set 560 comprises the hashes 540 as keys 552 and the respective lists 542 of offsets as values 554. See FIG. 5B as well as step 450 in FIG. 4A.

Figure 4B:
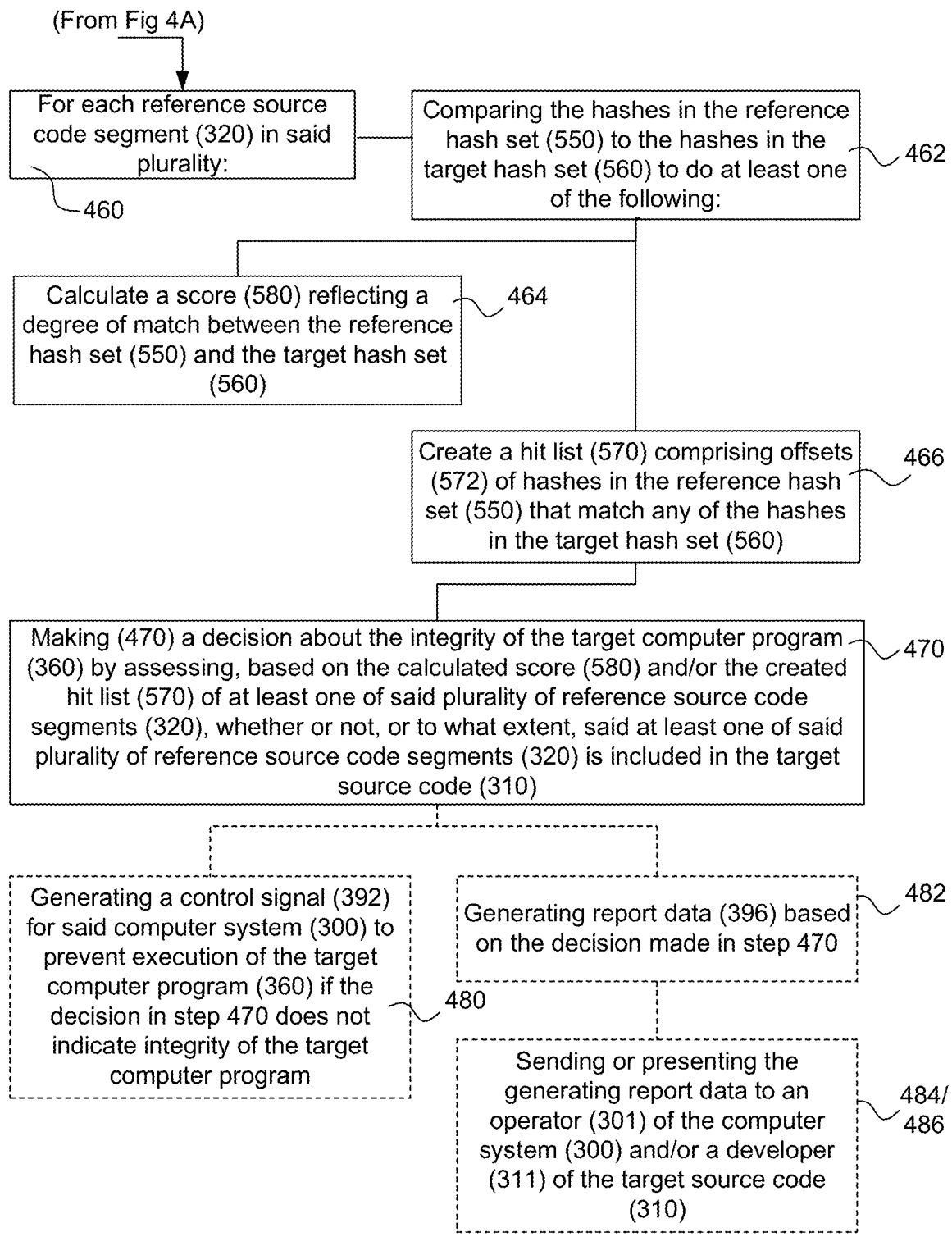
FIG. 4B is a second part of the flowchart diagram.
Figure 5C:
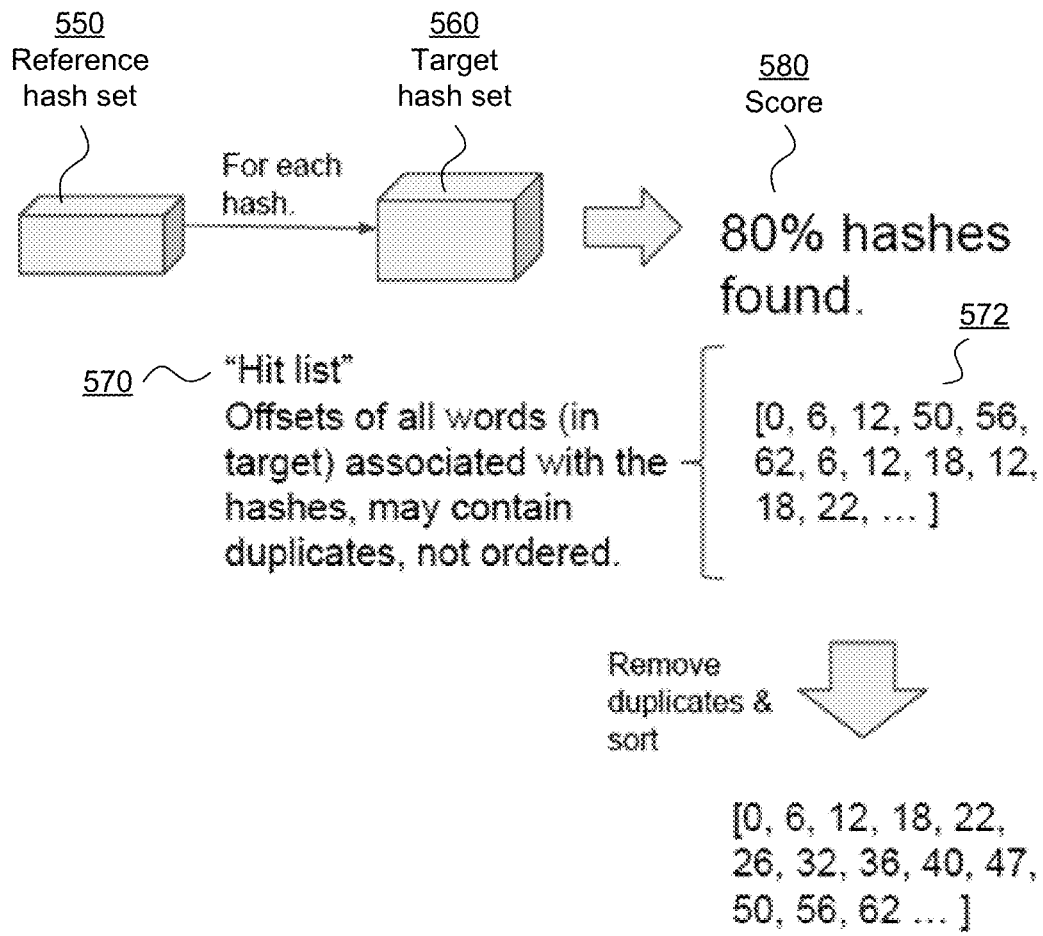

When the reference hash set 550 and target hash set 560 have been generated, the main processing functionality 374 continues by performing the following for each reference source code segment 320 in the plurality of reference source code segments (cf. 460 in FIG. 4B):

The hashes in the reference hash set 550 are compared to the hashes in the target hash set 560, see step 462 in FIG. 4B. The comparison is done in order to do at least one of the following activities:

Calculating a score 580 that reflects a degree of match between the reference hash set 550 and the target hash set 560. See FIG. 5C as well as step 464 in FIG. 4B. The score 580 may, for instance, be expressed as a percentage value.

Creating a hit list 570 which comprises offsets 572 of hashes in the reference hash set 550 that match any of the hashes in the target hash set 560. See FIG. 5C as well as step 466 in FIG. 4B.

Advantageously, both activities are performed, but in some embodiments one of them will be sufficient.

In some embodiments, the generated hit list 570 is sorted based on offset. This will allow efficient decision-making in the subsequent steps of the method in FIG. 4B.

In some embodiments, duplicate offsets may be removed from the hit list 570. Again, this will allow efficient decision-making in the subsequent steps of the method in FIG. 4B.

The main processing functionality 374 is then concluded by making a decision about the integrity of the target computer program 360. This can be seen in step 470 in FIG. 4B. The decision about the integrity of the target computer program 360 is made by assessing, based on the calculated score 580 and/or the created hit list 570 of at least one of the plurality of reference source code segments 320, whether or not, or to what extent, the at least one of said plurality of reference source code segments 230 is included in the target source code 310. Advantageously, the decision in step 470 in FIG. 4B is made by assessing whether all of said plurality of reference source code segments are included in the target source code 310, but alternative embodiments are conceivable for which some of the reference source code segments 320 may be excluded or ignored prior to or during the processing.

In one or more advantageous embodiments, the decision in step 470 in FIG. 4B is made by determining whether the generated and sorted hit list 570 is consecutive. The decision in step 470 in FIG. 4B then concludes that a particular reference source code segment 320, for which it has been determined that the hit list 570 is consecutive, is indeed included in the target source code 310.

The determining of whether the hit list 570 is consecutive may be made by examining whether the associated token indices follow a contiguous sequence of numbers, e.g. 5, 6, 7, 8, 9, 10 . . . . In effect, this means that the n-gram consisting of tokens 8, 9, 10 follow directly after the n-gram consisting of tokens 5, 6 and 7 in the particular reference source code segment 320.

Another way of determining whether the generated and sorted hit list 570 is consecutive may involve checking whether each respective associated token offset does not represent too large a "jump" from the preceding token offset. In effect, this means checking whether there are an excessive number of characters in the particular reference source code segment 320 between the start of a first token and the start of a second token—indicating that there is probably another token in between, rendering the hit list 570 in fact non-consecutive. Alternatively, the check may be directed at the number of characters in the particular reference source code segment 320 between the end of the first token and the start of the next (second) token.

In one or more alternative embodiments, the decision in step 470 in FIG. 4B is made by determining to what extent the hit list 570 is consecutive by establishing a length of a longest consecutive subset of the hit list 570. The decision in step 470 in FIG. 4B then concludes that a particular reference source code segment 320, for which the determining yielded a longest consecutive subset having a length which is above a threshold percentage of the full length of the hit list 570, is indeed included in the target source code 310. Such embodiments may be beneficial in that they will be able to identify a reference source code segment 320 as appearing in the target source code 310, even when the code has been subjected to moderate changes.

The post-processing functionality 376 of the apparatus 370 and method 400 may include generating a control signal 392 for the computer system 300 to prevent execution of the target computer program 360 if the decision in step 470 does not indicate integrity of the target computer program 360. Please see FIG. 3B as well as step 480 in FIG. 4B. This is advantageous since it may prevent hazards from occurring at the controlled external system 305 as a result of malfunction of the target computer program 360 when its integrity cannot be verified.

Alternatively or additionally, the post-processing functionality 376 of the apparatus 370 and method 400 may include generating report data 396 based on the decision made in step 470, wherein the report data 396 reflects the decision and at least one of the calculated score 580 and an indication of the at least one of the plurality of reference source code segments 320. This can be seen in FIG. 3B as well as at step 482 in FIG. 4B. The generated report data 396 may be sent (484 in FIG. 4B) or presented (486 in FIG. 4B) to an operator 301 of the computer system 300, and/or a developer 311 of the target source code 310. See FIG. 3B.

Sending or presenting the generated report data 396 is advantageous since it may alert the operator 301 that the integrity of the computer system 300 cannot be verified. In response, this may enable the operator 301 to take appropriate measures, for instance making a controlled shut-down of the computer system 300, retrieving and installing a certified version of the target computer program 360, etc., and thereby avoid hazardous effects as described above.

Sending or presenting the generated report data 396 may further be advantageous since it may put the developer 311 on notice. As a result, the developer 311 may check the target source code 310, make any corrections needed, and hence provide an updated version of the target computer program 360 to the computer system 300.

Some embodiments may include functionality to identify and handle a situation where the target source code 310 is too small in size to contain a particular reference source code segment 320, thereby improving the efficiency of the disclosed functionality. Accordingly, the computer-implemented method 400 and apparatus 370 may be configured for determining a size of the target source code 310, and determining a size of a particular reference source code segment 320 in the plurality of reference source code segments. If the determined size of the particular reference source code segment 320 exceeds the determined size of the target source code by a certain margin, it may be decided that the particular reference source code segment 320 is not included in the target source code. Accordingly, a negative decision about the integrity of the target computer program 360 may be made.

Alternatively, the computer-implemented method 400 and apparatus 370 may be configured for determining a size of the target hash set 560 generated for the target source code 310, and determining a size of the reference hash set generated for the particular reference source code segment. If the determined size of the reference hash set 550 exceeds the determined size of target hash set 560 by a certain margin, it may be decided that the particular reference source code segment 320 is not included in the target source code. Again, a negative decision about the integrity of the target computer program 360 may be made.

Figure 6:
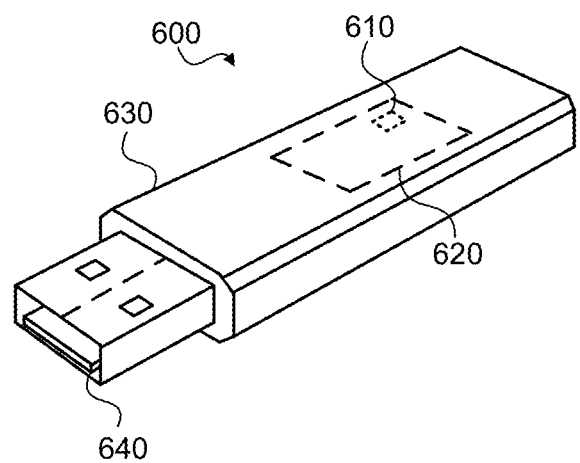
FIG. 6 is a schematic illustration of a computer-readable medium in one exemplary embodiment, capable of storing a computer program product.

FIG. 6 is a schematic illustration of a computer-readable medium 600 in one exemplary embodiment, capable of storing a computer program product 610. The computer-readable medium 600 in the disclosed embodiment is a memory stick, such as a Universal Serial Bus (USB) stick. The USB stick 600 comprises a housing 630 having an interface, such as a connector 640, and a memory chip 620. In the disclosed embodiment, the memory chip 620 is a flash memory, i.e. a non-volatile data storage that can be electrically erased and re-programmed. The memory chip 620 stores the computer program product 610 which is programmed with computer program code (instructions) that when loaded into a processing device, such as the processing device 212 or 371 as described above, will perform a method 400 according to any or all of the embodiments disclosed above. The USB stick 600 is arranged to be connected to and read by a reading device for loading the instructions into the processing device. It should be noted that a computer-readable medium can also be other mediums such as compact discs, digital video discs, hard drives or other memory technologies commonly used. The computer program code (instructions) can also be downloaded from the computer-readable medium via a wireless interface to be loaded into the processing device.

References to 'computer-readable storage medium', 'computer program product', 'tangibly embodied computer program' etc. or a 'controller', 'computer', 'processor', 'processing device', etc., should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The invention has been described above in detail with reference to embodiments thereof. However, as is readily understood by those skilled in the art, other embodiments are equally possible within the scope of the present invention, as defined by the appended claims.

What is claimed is:

1. A computer-implemented method for checking the integrity of a target computer program to be executed in a computer system the target computer program having a target source code, the method involving:
   A) obtaining a plurality of reference source code segments which are considered critical to the integrity of the target computer program;
   B) for each reference source code segment in said plurality of reference source code segments:
      i) processing the reference source code segment to derive tokens therein and their respective offsets in the segment;
      ii) for each n-gram of tokens in the reference source code segment, creating a hash and a list of the offsets of the tokens in the n-gram;
      iii) generating a reference hash set for the reference source code segment, the reference hash set comprising the hashes as keys and the respective lists of offsets as values;
   C) processing the target source code to derive tokens therein and their respective offsets in the target source code;
   D) for each n-gram of tokens in the target source code, creating a hash and a list of the offsets of the tokens in the n-gram;
   E) generating a target hash set for the target source code, the target hash set comprising the hashes from step D) as keys and the respective lists of offsets from step D) as values;
   F) for each reference source code segment in said plurality of reference source code segments:
      i) comparing the hashes in the reference hash set to the hashes in the target hash set to do at least one of the following:
         a) calculate a score reflecting a degree of match between the reference hash set and the target hash set; and
         b) create a hit list comprising offsets of hashes in the reference hash set that match any of the hashes in the target hash set; and
   G) making a decision about the integrity of the target computer program by assessing, based on the calculated score and/or the created hit list of at least one of said plurality of reference source code segments, whether or not, or to what extent, said at least one of said plurality of reference source code segments is included in the target source code.

2. The computer-implemented method as defined in claim 1, further comprising:
   generating a control signal for said computer system to prevent execution of the target computer program if the decision in step G) does not indicate integrity of the target computer program.

3. The computer-implemented method as defined in claim 1, further comprising:
   generating report data based on the decision made in step G), wherein the report data reflects the decision and at least one of:

the calculated score, and
an indication of said at least one of said plurality of reference source code segments; and
sending or presenting the generated report data to at least one of:
an operator of said computer system, and
a developer of said target source code.

4. The computer-implemented method as defined in claim 1, wherein step F) further involves:
c) sorting the hit list based on offset.

5. The computer-implemented method as defined in claim 4, wherein step F) further involves:
d) removing duplicate offsets from the hit list.

6. The computer-implemented method as defined in claim 4, wherein step G) involves:
determining whether the hit list is consecutive; and
concluding that a particular reference source code segment, for which it has been determined that the hit list is consecutive, is indeed included in the target source code.

7. The computer-implemented method as defined in claim 4, wherein step G) involves:
determining to what extent the hit list is consecutive by establishing a length of a longest consecutive subset of the hit list; and
concluding that a particular reference source code segment, for which the determining yielded a longest consecutive subset having a length which is above a threshold percentage of the full length of the hit list, is indeed included in the target source code.

8. The computer-implemented method as defined in claim 1, wherein the plurality of reference source code segments obtained in step A) contain source code that define critical functions representing key parts of the functionality to be performed by the computer system when the target computer program is executed.

9. The computer-implemented method as defined in claim 1, wherein the plurality of reference source code segments obtained in step A) contain technical background information for future use in modification or development of the target source code.

10. The computer-implemented method as defined in claim 1, wherein the plurality of reference source code segments obtained in step A) contain license statements or copyright notices about the right to use the target source code or respective parts thereof.

11. The computer-implemented method as defined in claim 1, further comprising:
determining a size of the target source code, or a size of the target hash set generated for the target source code;
determining a size of a particular reference source code segment in said plurality of reference source code segments, or a size of the reference hash set generated for said particular reference source code segment; and
if the determined size of the particular reference source code segment or the reference hash set exceeds the determined size of the target source code or the target hash set by a certain margin:
deciding that the particular reference source code segment is not included in the target source code; and
G) making a negative decision about the integrity of the target computer program.

12. An apparatus for checking the integrity of a target computer program to be executed in a computer system, the target computer program having a target source code, the apparatus comprising a computer processing device configured with instructions for:

A) obtaining a plurality of reference source code segments which are considered critical to the integrity of the target computer program;
B) for each reference source code segment in said plurality of reference source code segments:
i) processing the reference source code segment to derive tokens therein and their respective offsets in the segment;
ii) for each n-gram of tokens in the reference source code segment, creating a hash and a list of the offsets of the tokens in the n-gram;
iii) generating a reference hash set for the reference source code segment, the reference hash set comprising the hashes as keys and the respective lists of offsets as values;
C) processing the target source code to derive tokens therein and their respective offsets in the target source code;
D) for each n-gram of tokens in the target source code, creating a hash and a list of the offsets of the tokens in the n-gram;
E) generating a target hash set for the target source code, the target hash set comprising the hashes from step D) as keys and the respective lists of offsets from step D) as values;
F) for each reference source code segment in said plurality of reference source code segments:
i) comparing the hashes in the reference hash set to the hashes in the target hash set to do at least one of the following:
a) calculate a score reflecting a degree of match between the reference hash set and the target hash set; and
b) create a hit list comprising offsets of hashes in the reference hash set that match any of the hashes in the target hash set; and
G) making a decision about the integrity of the target computer program by assessing, based on the calculated score and/or the created hit list of at least one of said plurality of reference source code segments, whether or not, or to what extent, said at least one of said plurality of reference source code segments is included in the target source code.

13. The apparatus as defined in claim 12, wherein the processing device is further configured for:
generating a control signal for said computer system to prevent execution of the target computer program if the decision in G) does not indicate integrity of the target computer program.

14. The apparatus as defined in claim 12, wherein the processing device is further configured for:
generating report data based on the decision made in G), wherein the report data reflects the decision and at least one of:
the calculated score, and
an indication of said at least one of said plurality of reference source code segments; and
sending or presenting the generated report data to at least one of:
an operator of said computer system, and
a developer of said target source code.

15. The apparatus as defined in claim 12, wherein the processing device is further configured for performing F) by:
c) sorting the hit list based on offset.

16. The apparatus as defined in claim 15, wherein the processing device is further configured for performing F) by:
d) removing duplicate offsets from the hit list.

17. The apparatus as defined in claim 15, wherein the processing device is further configured for performing G) by:
   determining whether the hit list is consecutive; and
   concluding that a particular reference source code segment, for which it has been determined that the hit list is consecutive, is indeed included in the target source code.

18. The apparatus as defined in claim 15, wherein the processing device is further configured for performing G) by:
   determining to what extent the hit list is consecutive by establishing a length of a longest consecutive subset of the hit list; and
   concluding that a particular reference source code segment, for which the determining yielded a longest consecutive subset having a length which is above a threshold percentage of the full length of the hit list, is indeed included in the target source code.

19. The apparatus as defined in claim 12, wherein the plurality of reference source code segments obtained in A) contain source code that define critical functions representing key parts of the functionality to be performed by the computer system when the target computer program is executed.

20. The apparatus as defined in claim 12, wherein the plurality of reference source code segments obtained in A) contain technical background information for future use in modification or development of the target source code.

21. The apparatus as defined in claim 12, wherein the plurality of reference source code segments obtained in A) contain license statements or copyright notices about the right to use the target source code or respective parts thereof.

22. The apparatus as defined in claim 12, wherein the processing device is further configured for:
   determining a size of the target source code, or a size of the target hash set generated for the target source code;
   determining a size of a particular reference source code segment in said plurality of reference source code segments, or a size of the reference hash set generated for said particular reference source code segment; and
   if the determined size of the particular reference source code segment or the reference hash set exceeds the determined size of the target source code or the target hash set by a certain margin:
      deciding that the particular reference source code segment is not included in the target source code; and
      G') making a negative decision about the integrity of the target computer program.

* * * * *